United States Patent
Narita et al.

[11] Patent Number: 6,025,667
[45] Date of Patent: Feb. 15, 2000

[54] PERMANENT MAGNET ROTOR TYPE ELECTRIC MOTOR WITH DIFFERENT PERMANENT MAGNET MATERIALS

[75] Inventors: Kenji Narita; Takashi Suzuki; Hiroyuki Okudera; Yuji Kawai; Yuji Souma; Koji Kawanishi; Yoshichika Fukuda, all of Kawasaki, Japan

[73] Assignee: Fujitsu General Limited, Kawasaki, Japan

[21] Appl. No.: 09/159,668

[22] Filed: Sep. 24, 1998

[30] Foreign Application Priority Data

Sep. 29, 1997 [JP] Japan ................................. 9-281291

[51] Int. Cl.⁷ ............................. H02K 1/27; H02K 21/14
[52] U.S. Cl. ............................................................ 310/156
[58] Field of Search ............................................... 310/156

[56] References Cited

U.S. PATENT DOCUMENTS

| | | | |
|---|---|---|---|
| 4,127,786 | 11/1978 | Volkrodt | 310/156 |
| 4,358,697 | 11/1982 | Liu et al. | 310/156 |
| 4,405,873 | 9/1983 | Nondahl | 310/156 |
| 4,476,408 | 10/1984 | Honsinger | 310/156 |
| 5,097,166 | 3/1992 | Mikulic | 310/156 |

FOREIGN PATENT DOCUMENTS

| | | | |
|---|---|---|---|
| 63-9102 | 1/1988 | Japan | 310/156 |
| 4-225439 | 9/1992 | Japan | 310/156 |
| 8-275419 | 10/1996 | Japan | 310/156 |
| 9-205746 | 8/1997 | Japan | 310/156 |
| 10-191585 | 7/1998 | Japan | 310/156 |
| 11-113198 | 4/1999 | Japan | 310/156 |

*Primary Examiner*—Nestor Ramirez
*Assistant Examiner*—K. Imayoshi Tamai
*Attorney, Agent, or Firm*—Kanesaka & Takeuchi

[57] ABSTRACT

In an electric motor, such as a DC brushless motor or the like, having a permanent magnet in a rotor, each magnetic pole is formed of three permanent magnets, and the permanent magnets are made of at least two kinds of magnetic materials represented by ferrite magnet and rare-earth magnet. Thus, in a permanent magnet rotor type electric motor, a reluctance torque and a magnetic flux density can be selectively established, and cost is reasonable, corresponding to the quality.

6 Claims, 7 Drawing Sheets

PERMANENT MAGNET ROTOR TYPE ELECTRIC MOTOR WITH DIFFERENT PERMANENT MAGNET MATERIALS

BACKGROUND OF THE INVENTION

1. Field of the Invention

This invention relates to an electric motor having a permanent magnet in a rotor, such as Brushless DC motor or the like and, more specifically, to an electric motor in which a magnetic flux density, a reluctance torque and so on can be selectively established, appropriate as a driving source of a compressor of an air conditioner, for example.

2. Description of the Related Art

In the electric motor of the type as described above, a permanent magnet is embedded in a core of an inner rotor of the electric motor, an example thereof being shown respectively in FIG. 8 and FIG. 9 each of which is a plane view showing the inside of this electric motor from a plan perpendicular to the axis of rotation.

In the example shown in FIG. 8 a rotor core 2 is disposed inside a stator core 1, having 24 slots for example, in which a field magnet rotates. In this case, the number of poles of the electric motor is four, therefore four permanent magnets 3 are arranged in the rotor core 2.

Each permanent magnet 3 is formed to be a band plate shape with rectangular cross-section, and each pair of the permanent magnets 3 is disposed to face each other along a direction perpendicular to a diameter line of the rotor core 2 in the vicinity of the outer circumference of the rotor core 2. Each permanent magnet 3 is embedded inside the rotor core 2 along a direction perpendicular to paper of FIG. 8.

Between the adjacent permanent magnets 3, holes 4 as flux barrier for preventing short-circuit and leak of magnetic flux between the adjacent permanent magnets are formed. In this example, the holes 4 are represented as triangle holes and disposed at both ends of the permanent magnet 3. In the center of the rotor core 2, a center hole 5 is formed to allow a rotating shaft (not shown) to pass therethrough.

In this structure, when the magnetic flux distribution in a gap portion (between teeth of the stator core 1 and the permanent magnet 3) caused by the permanent magnet 3 is in a sine wave state, torque T of the electric motor is expressed by, $T=Pn\{\Phi a \cdot Ia \cdot \cos \beta - 0.5(Ld-Lq) \cdot I2 \sin 2\beta\}$, where T is an output torque, $\Phi a$ is an armature flux linkage caused by the permanent magnet 3 on the coordinate axes d and q, Ld and Lq are the inductance on the axis d and the inductance on the axis q respectively, Ia is amplitude of an armature current on the coordinate axes d and q, $\beta$ is a lead angle of the armature current from the axis q on the coordinate axes d and q, and Pn is a pole logarithm.

In the above expression, the first term expresses a magnet torque 15 generated by the permanent magnet 3, and the second term expresses a reluctance torque generated by a difference between the inductance on the axis d and the inductance on the axis q. Refer to a treatise published in T. IEE Japan, Vol. 117-D, No. 8. 1997 for further detail.

In the rotor core 2 shown in FIG. 9 as another conventional example, a permanent magnet 6 having arch-shaped cross-section is used, and the torque T thereof is also found by the aforementioned operational expression.

Typically, ferrite magnet and rare-earth magnet are used for the permanent magnets 3 and 6 employed in the aforementioned type of the electric motor.

The ferrite magnet is less expensive and available for forming the permanent magnet in various shapes due to easiness of forming thereof, but the magnetic flux density is low, therefore hindering the reduction in size of the rotor core.

On the other hand, the rare-earth magnet has a high magnetic flux density, so that the reduction in size of the rotor core is easy, but the shape of the permanent magnet is limited by difficulty of forming thereof. In addition, the rare-earth magnet is more expensive than the ferrite magnet.

Since both the ferrite magnet and the rare earth magnet have merits and demerits as explained above, conventionally for reasons of the use and/or a cost of a motor, either the ferrite magnet or the rare-earth magnet is chosen for all permanent magnets of magnetic poles. In this case, there are disadvantages described below.

For example, in the case that the magnetic pole is formed of only the ferrite magnet, the amount of the magnet should be increased to increase the magnetic flux density. Therefore the polarized area becomes large, and consequently, the magnet occupies the most of the rotor core. Accordingly, the inductance on the axis q is small, so that the difference of the inductance on the axis q and the inductance on the axis d (parameter of a reluctance torque: refer to the aforementioned operational expression) becomes small, with the result that a sufficient reluctance torque cannot be attained.

In the case that the magnetic pole is formed of only the rare-earth magnet, the magnetic flux density is high, so that the magnet does not occupy the most of the rotor core as the ferrite magnet, but the magnetic flux density is often excessively high, and additionally the rare-earth magnet is expensive, therefore the motor is increased in cost.

As described hereinbefore, conventionally, a proper permanent magnet having an intermediate state between the ferrite magnet and the rare-earth magnet is troublesome to obtain, that is to say it is difficult to select the required magnetic flux density and reluctance torque, with low cost.

SUMMARY OF THE INVENTION

The present invention has been made for resolving the aforementioned disadvantages. It is an object of the present invention to provide a permanent magnet rotor type electric motor capable of selectively determining a magnet flux density and a reluctance torque and having a reasonable cost.

According to the present invention, the object can be attained in a permanent magnet rotor type electric motor in which a rotor core having magnetic poles formed of the permanent magnets therein is disposed inside a stator core generating a rotation magnetic field, wherein the magnetic poles in a rotor core are formed of three or more permanent magnets, and at least two kinds of magnetic materials are used for the permanent magnets.

The two kinds of magnetic materials may be ferrite magnet and rare-earth magnet, and by using the above magnetic materials together, the required magnetic flux density is easily attained. In addition, in this case, the occupying rate of the magnets in the core can be lowered and the inductance on the axis q is larger than those in the case in which each magnetic pole is formed of only the ferrite magnet having a low magnetic flux density for example. Accordingly, a difference between the inductance on the axis q and the inductance on the axis d can be large. As is described above, according to the present invention, a selecting range for a reluctance torque and a magnetic flux density can be enlarged, and a reasonable cost corresponding to the quality can be attained.

To attain the above object, in the present invention a permanent magnet rotor type electric motor has a rotor core having magnetic poles formed of the permanent magnets therein, which is disposed inside a stator core generating a rotation magnetic field. The rotor core has a first permanent magnet disposed on a boundary line along a diametrical line of the rotor core between the adjacent magnetic poles and a second permanent magnet disposed in the vicinity of the outer circumference of the rotor core in each magnetic pole, in which each magnetic pole is practically formed of three permanent magnets such that the first permanent magnet as a magnet is shared between the adjacent magnetic poles, and the first permanent magnet and the second permanent magnet are made of different magnetic materials.

In this case, the first permanent magnet is formed to be a band plate shape with rectangular cross-section and polarized in a direction of the plate width, and disposed in the rotor core to position the center line of the plate width on the boundary line, so that one pole thereof serves as any one of the adjacent magnetic poles and the other pole serves as the other of the adjacent magnetic poles.

When the ferrite magnet is used for the first permanent magnet, the rare-earth magnet is used for the second permanent magnet. Conversely, when the rare-earth magnet is used for the first permanent magnet, the ferrite magnet is used for the second permanent magnet.

In any way, the first permanent magnet is formed to be a band plate shape with rectangular cross-section and polarized in a direction of the plate width, and disposed in the rotor core to position the center line of the plate width on the boundary line.

On the other hand, for the second permanent magnet, various shapes can be available. For example, a band plate shape with rectangular cross-section, arch-shaped cross-section, or trapezoid cross-section may be used. In the case of a shape of rectangular cross-section, the second permanent magnet is preferably disposed along a direction perpendicular to a diametrical line of the rotor core. In the case of a shape of arch-shaped cross-section, the second permanent magnet is preferably disposed in a state that the convex face thereof is oriented toward the center of the rotor core. Further, in the case of a shape of trapezoid cross-section, the second permanent magnet is advisably disposed in a state that the upside thereof is oriented toward the center of the rotor core.

Furthermore, a hole for flux barrier is formed between the first permanent magnets in the vicinity of the inner circumference of the rotor core, thereby preventing short-circuit and leak of the magnetic flux in between the adjacent permanent magnets. According to the preferable embodiment, holes for the flux barrier are also formed at both ends of the second permanent magnet.

In the present invention it is preferable that the rotor core is formed of a laminated body made of a magnetic steel plate which is stamped out through a pressing process. In this case, it is desirable in terms of manufacturing that holes for inserting the permanent magnets are opened in the laminated body of the magnetic steel plate during the pressing process so that the first permanent magnet and the second permanent magnet are embedded to be polarized. Thereby, a conventional producing processes can be continuously employed, so that the production cost is not increased.

The present invention is appropriate for a brushless DC motor used for driving a compressor in an air conditioner, whereby the performance of the air conditioner can be improved.

BRIEF DESCRIPTION OF THE DRAWINGS

The present invention will be described further hereinafter, by way of example only, with reference to the accompanying drawings in which.

DETAILED DESCRIPTION OF PREFERRED EMBODIMENT(S)

Figure 1:
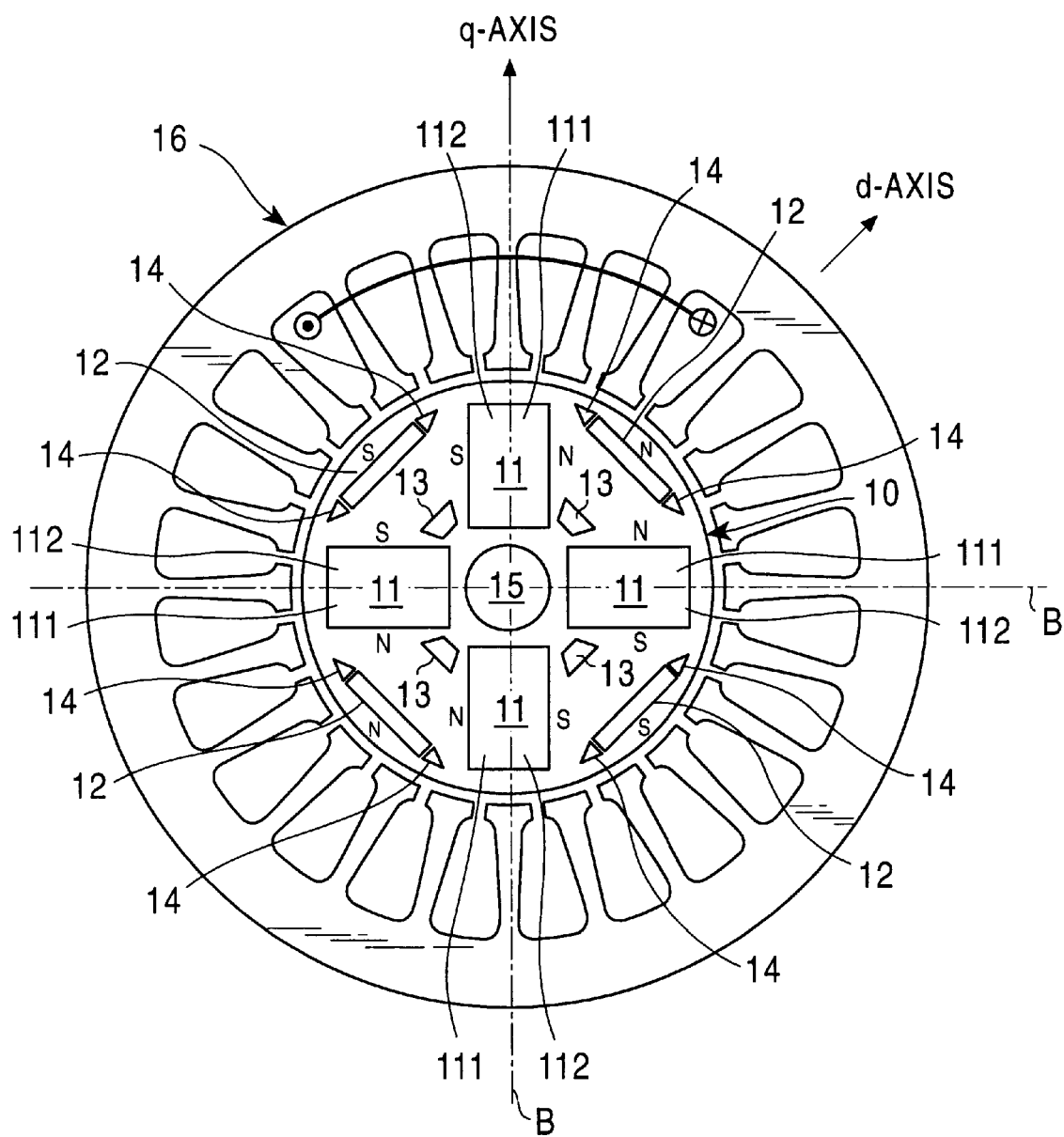
FIG. 1 is a diagrammatic plan view showing a structure of a permanent magnet rotor type electric motor as an embodiment according to the present invention from a plane perpendicular to the axis of rotation thereof.
Figure 3:
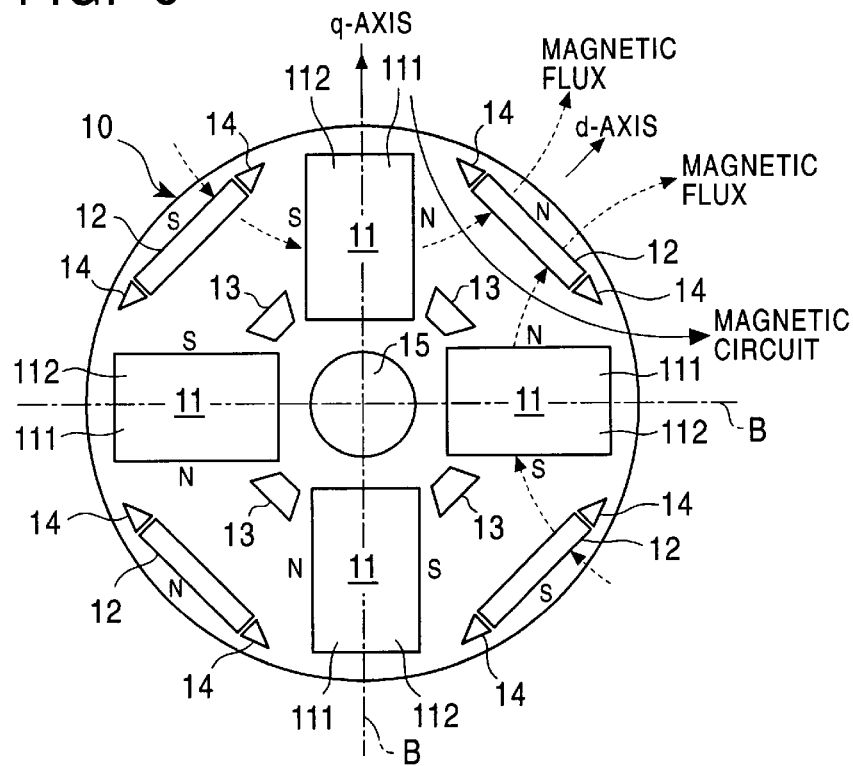
FIG. 3 is an enlarged plan view of the rotor core shown in the above embodiment.

In the present invention, a magnetic flux density and a reluctance torque can be established in required values by forming each magnetic pole in a rotor core of a plurality of permanent magnets and making the permanent magnets of different magnetic materials. Therefore, as shown in FIG. 1 and FIG. 3, each magnetic pole in a rotor core 10 is formed of a first permanent magnet 11 of ferrite magnet and a second permanent magnet 12 of rare-earth magnet, and the permanent magnet 11 is shared between the adjacent magnetic poles in this embodiment.

Figure 8:
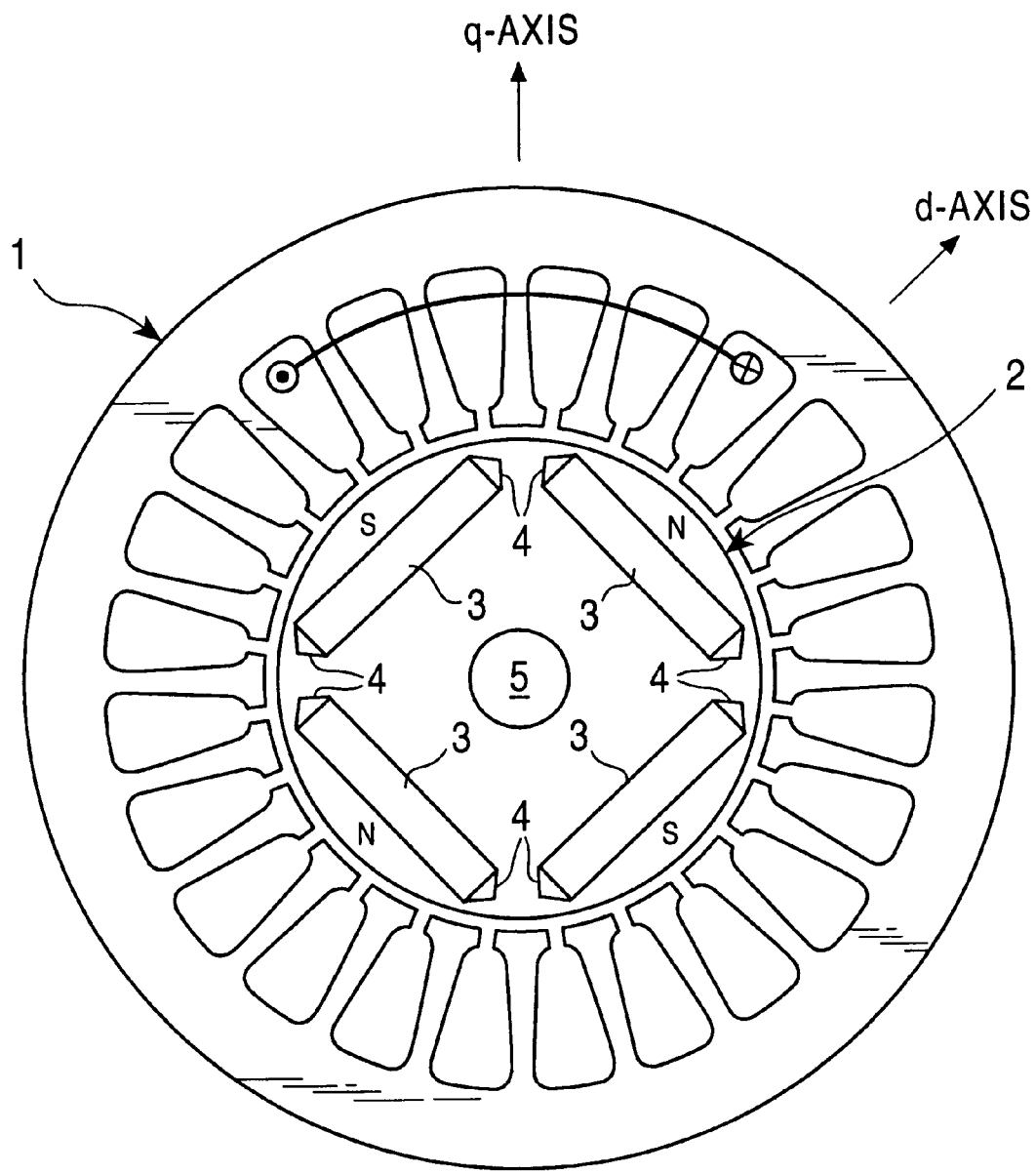
FIG. 8 is a diagrammatic plan view showing a structure of a permanent magnet rotor type electric motor as a first conventional example, which is similar to FIG. 1.
Figure 9:
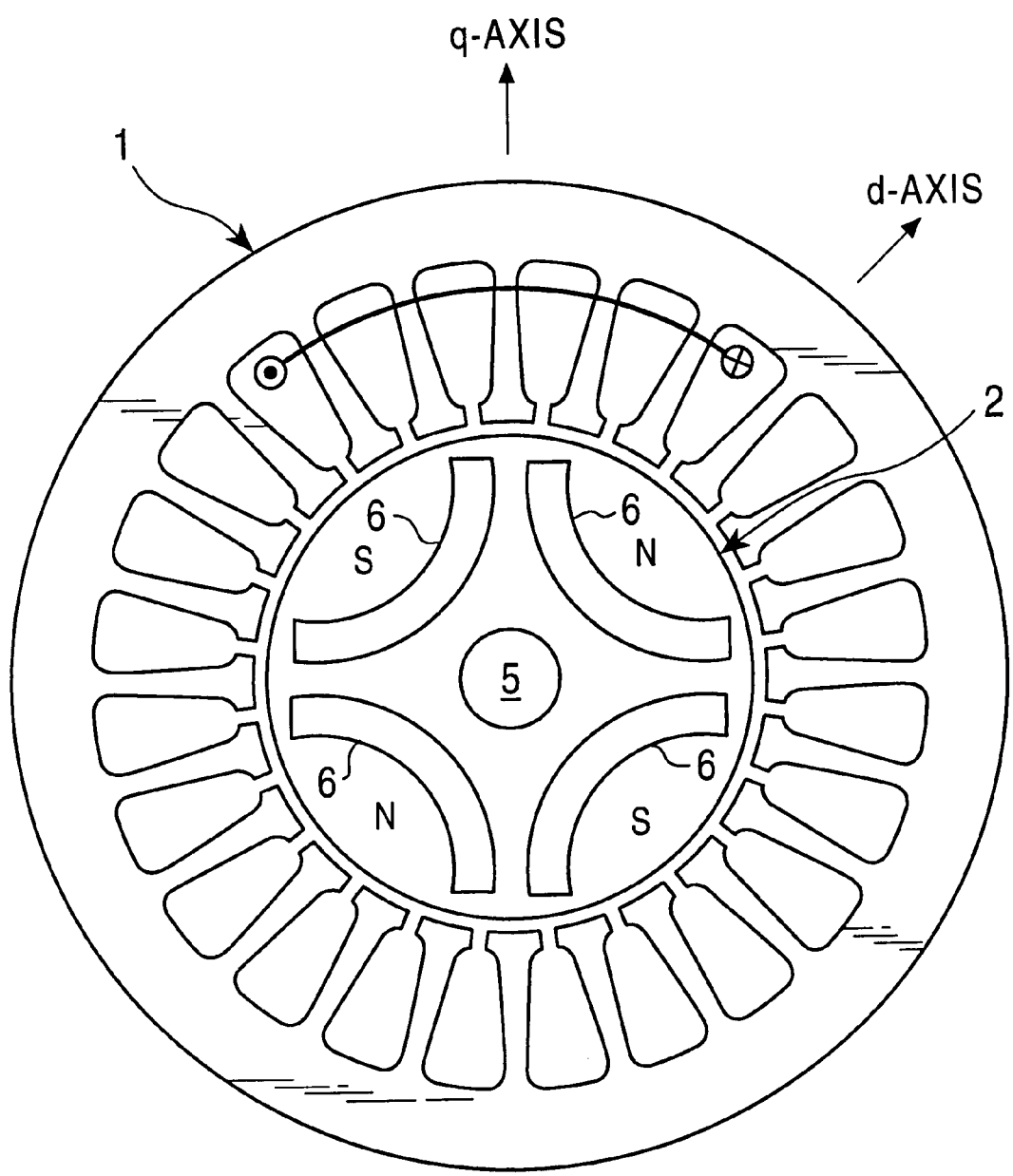
FIG. 9 is a diagrammatic plan view showing a structure of a permanent magnet rotor type electric motor as a second conventional example.

Incidentally, the rotor core 10 is made of a magnetic steel plate and disposed inside a stator core 16 generating a rotation magnetic field. The explanation of the stator core 16 will be omitted since, in the performance of the present invention, the stator core 16 may be similar to the stator core 1 shown in FIG. 8 which is explained hereinbefore.

The first permanent magnet 11 made of the ferrite magnet is formed to be a band plate shape which is slightly thick having rectangular cross-section and polarized in a direction of the plate width. In FIG. 1, one axis q and the other axis perpendicular thereto are magnetic-pole boundary lines between the adjacent magnetic poles, which pass through the center of the rotor core 10. When each of the boundary lines is B, each first permanent magnet 11 is disposed between the adjacent magnetic poles so that the center line of the plate width thereof is positioned on a boundary line B. That is to say each first permanent magnet 11 is imaginary divided by a boundary line B into a magnet portion 111 on the north pole side and a magnet portion 112 on the south pole side.

In this embodiment, the second permanent magnet 12 made of the rare-earth magnet has rectangular cross-section similar to the first permanent magnet 11 but is formed to be a band plate shape which is slightly thin. The second permanent magnet 12 is disposed along a direction perpendicular to a diametrical line of the rotor core 10 in the vicinity of the outer circumference of the rotor core 10 in each magnetic pole. Accordingly, in each magnetic pole, the north pole is formed of three magnets which are two magnet portions 111 and 111 of the adjacent first permanent magnets 11 and 11 and the second permanent magnet 12 in the north pole, and the south pole is also formed of three magnets which are two magnet portions 112 and 112 of the adjacent first permanent magnets 11 and 11 and the second permanent magnet 12 in the south pole.

Differently from the above embodiment, two permanent magnets corresponding to each of magnet portions 111 and 112 may be disposed in parallel to each other along a boundary line B. In this embodiment, the second permanent magnet 12 has a sectional rectangular shape, but the second permanent magnet 12 may have a sectional arch-shape and be disposed to orient the convex face thereof toward the center of the rotor core 10.

At the end of each first permanent magnet 11 in the vicinity of the inner circumference of the core and between the adjacent first permanent magnets 11 and 11, a hole 13 for the flux barrier is formed to prevent short-circuit and leak of the magnetic flux, occurring between the first permanent magnets 11. And also, at both ends of second permanent magnet 12, holes 14 and 14 for flux barriers are respectively formed because of the same reason as above. Incidentally, a center hole 15 for passing a rotating shaft (not shown) is formed on the axis line of the rotor core 10.

Next, a magnetic flux density and a reluctance torque of the rotor core 10 will be explained with reference to FIG. 3. In the drawing, a curve line of a broken line with arrows shows the magnetic flux and a curve line of a solid line with arrows shows a magnetic circuit.

According to the present invention, the first permanent magnet 11 made of the ferrite magnet is shared between the adjacent magnetic poles and the second permanent magnet 12 made of the rare-earth magnet is disposed in each magnetic pole, so that, as compared with the using of the ferrite magnet only, the magnetic flux density can be increased further, and additionally, the distance between the first permanent magnet 11 and the second permanent magnet 12 can be longer.

Additionally, the occupying rate of the ferrite magnet in the core is controlled, therefore, as compared with the case that each magnetic pole is formed of the ferrite magnet only for example, the magnetic resistance of the magnetic circuit becomes low. That is to say, when each magnetic pole is formed of only the ferrite magnet, the most of the rotor core 10 is occupied with the ferrite magnet to attain the same magnetic flux density as that in this embodiment, so that the magnetic resistance of the magnetic circuit becomes high naturally.

As described thus far, in the embodiment, the magnetic resistance of the magnetic circuit can be low by decreasing the occupying rate of the permanent magnet and increasing the occupying rate of a magnetic steel plate which is the body of the rotor core 10, thereby the inductance on the axis q can be large. Therefore, a difference between the inductance on the axis q and the inductance on the axis d becomes large, which means the reluctance torque can be increased.

According to the embodiment, the required magnetic flux density can be attained by controlling the used amount of the ferrite magnet as the first permanent magnet 11 and the rare-earth magnet as the second permanent magnet 12. For example, a lower magnetic flux density can be attained comparing to the case that all the magnetic poles are formed of the rare-earth magnet.

On the other hand, in a case where the ferrite magnets are used for all the magnetic poles to attain the magnetic flux density to be needed, the thickness of the permanent magnet (polarized area) often exceeds the limit in the manufacturing. However, the magnetic flux density can be appropriately controlled by using the ferrite magnet and the rare-earth magnet together. Therefore, the required magnetic flux density is easily attained without making the polarized area large.

Further, short-circuit and leak of the magnetic flux can be prevented by the hole 13 for the flux barrier which is formed between the first permanent magnets 11 and the holes 14 for the flux barrier which are formed at both ends of the second permanent magnet 12, so that the magnetic flux error by the first and the second permanent magnets 11 and 12 is small and the required magnetic flux density can be further easily attained.

Furthermore, the additional using of the less expensive ferrite magnet controls the amount of the rare-earth magnet used, thereby attaining a lower cost comparing to the case in which all the magnetic poles are formed of the rare-earth magnet.

Figure 2:
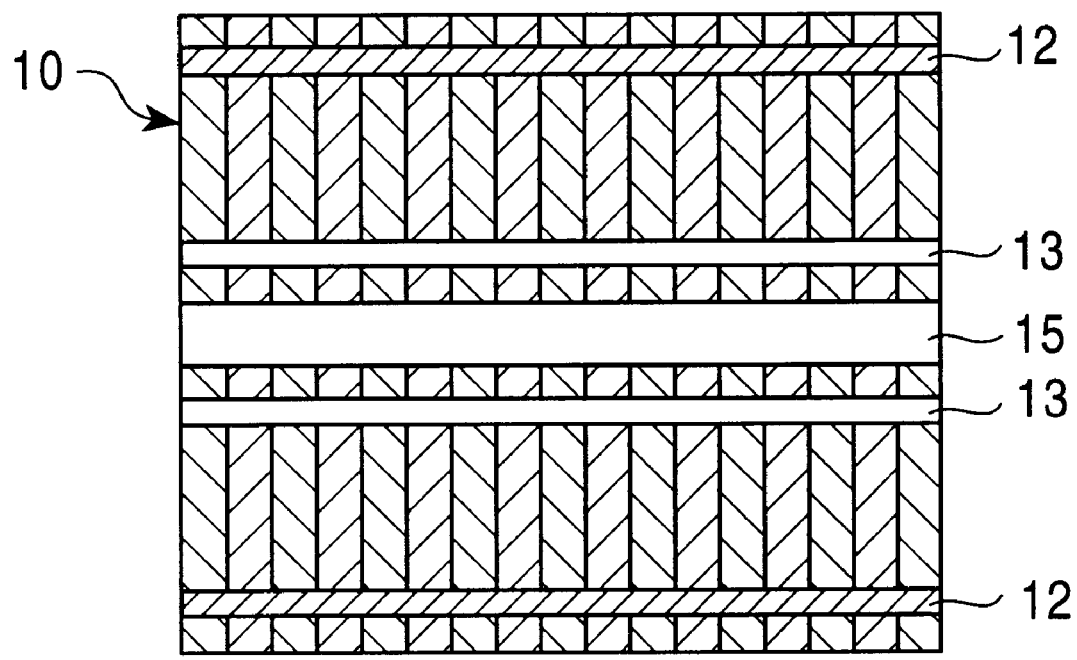
FIG. 2 is diagrammatic vertical sectional view along the axis d of a rotor core shown in the above embodiment.

As shown in FIG. 2, the rotor core 10 is produced through processes in which magnetic steel plates are mechanically laminated inside a die (not shown) after being stamped out in the same shape by pressing. Preferably, concurrently with the pressing process, spaces (holes) accommodating the permanent magnets 11 and 12 are opened in all the magnetic steel plates, and all the permanent magnets 11 and 12 are embedded inside the spaces to be polarized. It is advisable that the holes 13 and 14 for the flux barrier are opened during the above process. The permanent magnets 11 and 12 are inserted into the rotor core 10 in the lateral direction in FIG. 2.

According to the above description, since the rotor core 10 is produced through the conventional press processes, the production-efficiency is not reduced, and also the production cost is not increased.

Those skilled in the art will determine positions of attaining sufficient strength for enduring centrifugal force during the rotation of the rotor core 10, in regard to the position of each end of the permanent magnets 11 and 12, specifically each position thereof in the vicinity of the outer circumference of the rotor core 10, and each position for forming the holes 13 and 14 for the flux barrier. Additionally, the hole for accommodating (embedding) the second permanent magnet 12 and the holes 14 for the flux barrier, formed at both ends of the second permanent magnet 12, may be integrally formed, namely, formed as a linked hole.

A "Brushless" DC motor having the rotor core 10 is suitable for driving a compressor of an air conditioner, and the performance of the air conditioner can be improved (enhancement of the operating efficiency, reduction in noise or vibrations) without increasing in cost by the blushless DC motor.

Figure 4:
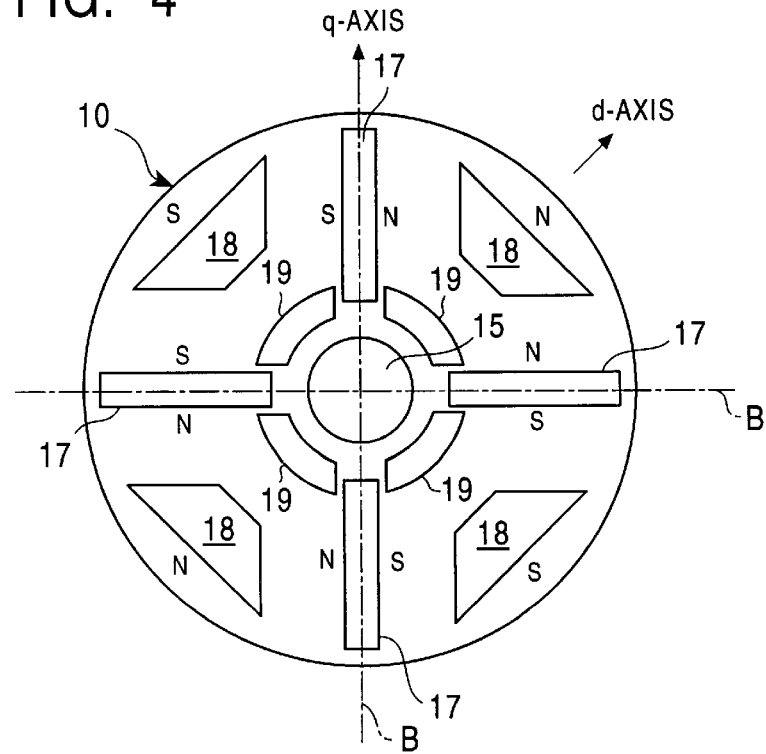
FIG. 4 to FIG. 7 are diagrammatic plan views showing modifications of the above rotor core.
Figure 5:
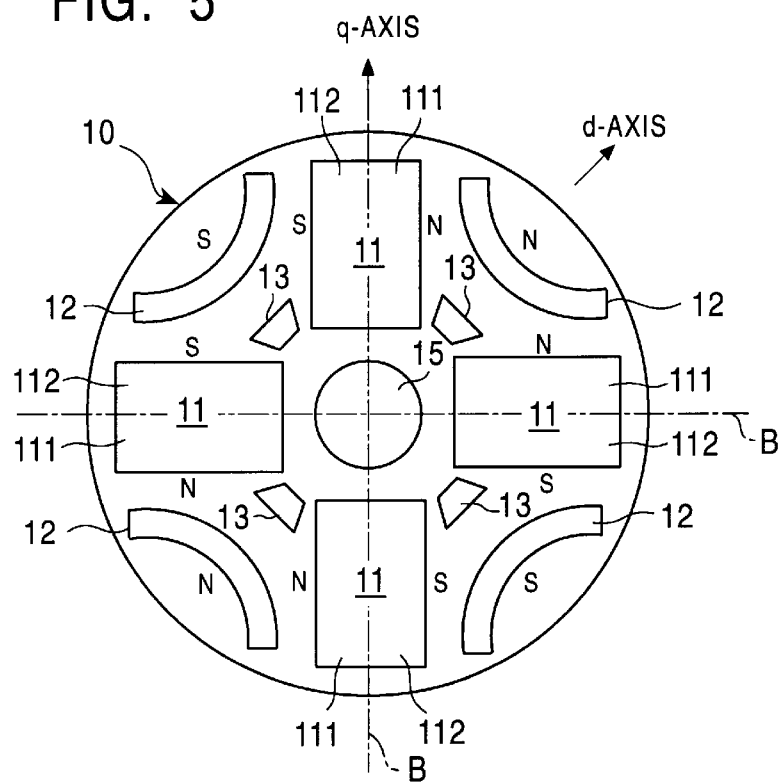

Next, a modification of the rotor core 10 shown in FIG. 4 will be described below. In the modification, a first permanent magnet 17 made of the rare-earth magnet is disposed on a boundary line B between the adjacent magnetic poles, and a second permanent magnet 18 made of the ferrite magnet is disposed in the vicinity of the outer circumference of the rotor core 10 in each magnetic pole. That is to say, the ferrite magnet and the rare-earth magnet are disposed in converse with the aforementioned embodiment.

The first permanent magnet 17 made of the rare-earth magnet is formed to be a slightly thin band-plate shape having rectangular cross-section and disposed so that the center line of the plate width lies upon a boundary line between the magnetic poles, therefore the first permanent magnet 17, as the first permanent magnet 11 of the aforementioned embodiment, is shared between the adjacent magnetic poles.

On the other hand, the second permanent magnet 18 made of the ferrite magnet has a trapezoid shape in section and disposed so that the upside thereof which is shorter side is oriented toward the center of the rotor core 10 in the vicinity of the outer circumference in each magnetic pole.

Further, a hole 19 for the flux barrier is formed at the end of the first permanent magnet 17 in the vicinity of the inner circumference of the core, and between the adjacent first permanent magnets 17 and 17, to prevent short-circuit and leak of the magnetic flux. In the modification, each hole 19 for the flux barrier is individually formed in an arch-shape around the center hole 15.

According to the modification, the first permanent magnet 17 is made of the rare-earth magnet and the magnetic flux density is high, therefore the polarized area is smaller than the first permanent magnet 11 of the aforementioned embodiment (refer to FIG. 3). On the other hand, the second permanent magnet 18 is made of the ferrite magnet and the magnetic flux density is low, therefore the polarized area is larger than the second permanent magnet 12 of the aforementioned embodiment (refer to FIG. 3).

As to the magnetic flux density, there is no big difference from the aforementioned embodiment. The occupying rate of the second permanent magnet 18 in the core becomes high, but the occupying rate of the first permanent magnet 17 in the core becomes low, thus the magnetic resistance of the magnetic circuit remains low as in the case the aforementioned embodiment. Accordingly, a difference between the inductance on the axis q and the inductance on the axis d becomes large, so that the reluctance torque can be increased.

Figure 6:
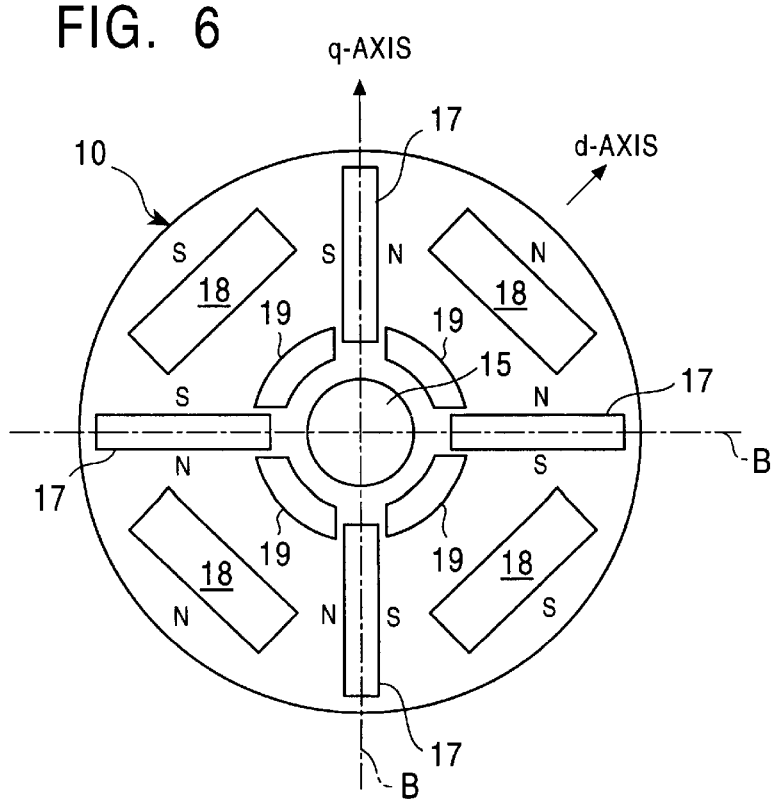
Figure 7:
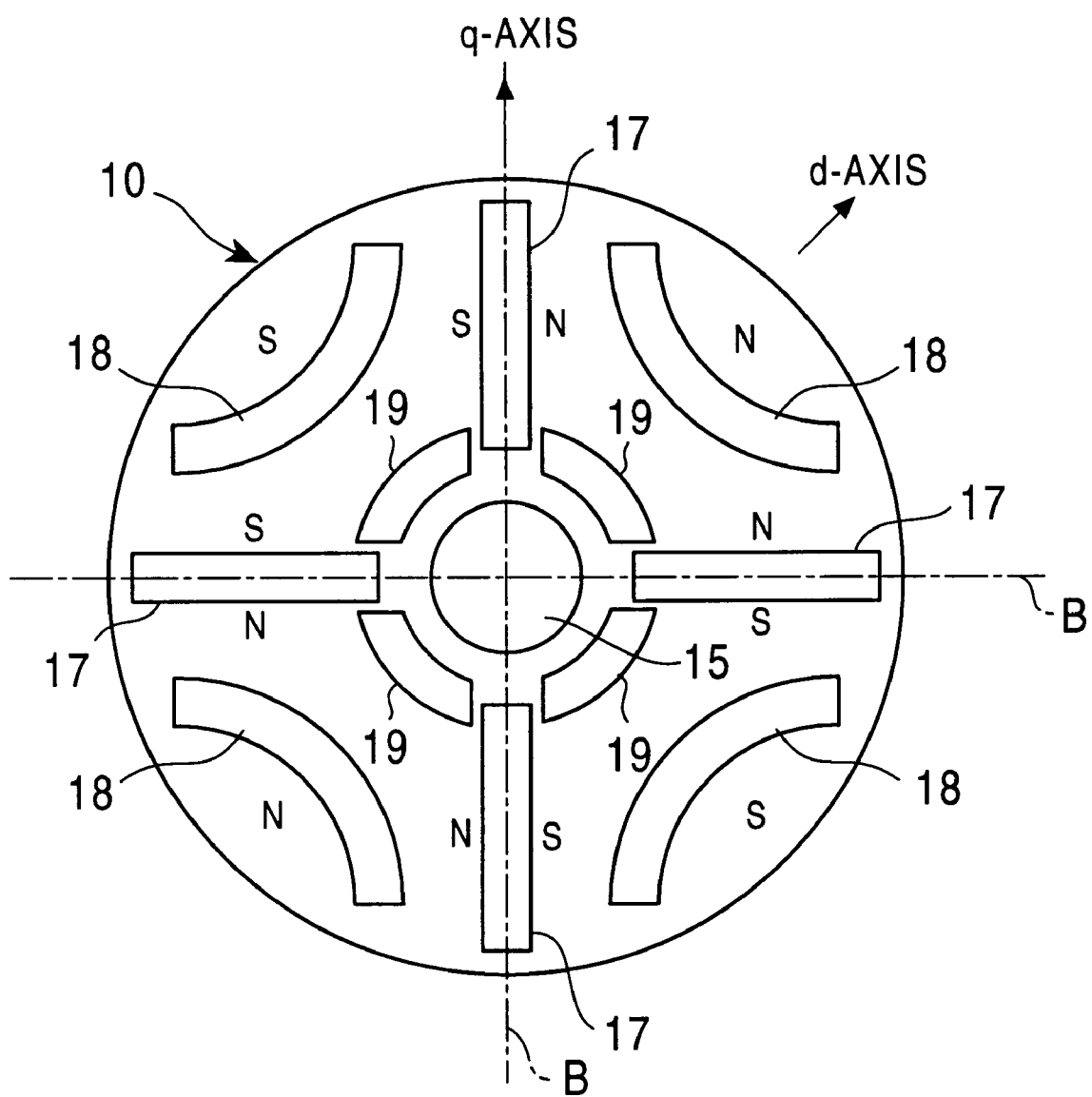

Furthermore, as necessary in designing, the second permanent magnet 18 may be formed to be a band plate with rectangular cross-section and disposed along a direction perpendicular to a diametrical line of the rotor core 10 as shown in FIG. 6. Alternatively, the second permanent magnet 18 may be formed to be a band plate with arch-shaped cross-section and disposed to orient the convex face thereof toward the center of the rotor core 10 shown in FIG. 7.

In any modification, by various combinations of the ferrite magnet and the rare-earth magnet, the reluctance torque and the magnetic flux density can be selected from various values, that is to say the degree of selection thereof can be enlarged.

Although the present invention has been shown and described with respect to a best mode embodiment thereof, those skilled in the art understanding the subject-matter of the present invention should readily think out other changes, variations, and equivalents thereof, so that the scope of the present invention should be within the scope of the accompanying claims and the equivalencies thereof.

What is claimed is:

1. A permanent magnet rotor type electric motor, comprising:

a stator core for generating a rotation magnetic field, and a rotor core rotationally disposed inside the stator core and including first and second permanent magnets made of materials different from each other and forming a plurality of magnetic poles, each first permanent magnet being formed of a band plate shape with a rectangular cross section and polarized in a direction perpendicular to a boundary plane along a radial line of the rotor core between adjacent magnetic poles, a center plane of each first permanent magnet being disposed on the boundary plane between the adjacent magnetic poles, each second permanent magnet being disposed near an outer circumference of the rotor core for each magnetic pole so that each magnetic pole is formed of three permanent magnets including two of the first permanent magnets, each being shared by adjacent magnetic poles, and one of the second permanent magnets situated between the two of the first permanent magnets, half of the first permanent magnet being used for one magnetic pole and the other half of the first permanent magnet being used for the other magnetic pole;

where said rotor further includes first holes for flux barrier, each being located between the first permanent magnets in the vicinity of an inner circumference of the rotor core, and second holes for flux barrier formed at both ends of each second permanent magnet, and wherein said first hole has an arc shape.

2. The permanent magnet rotor type electric motor according to claim 1, wherein the first permanent magnet is made of ferrite magnet with rectangular cross-section, and wherein the second permanent magnet is made of rare-earth magnet with rectangular cross-section, and disposed along a direction perpendicular to a diametrical line of the rotor core.

3. The permanent magnet rotor type electric motor according to claim 1, wherein the first permanent magnet is made of a ferrite magnet with rectangular cross-section, and wherein the second permanent magnet is made of a rare-earth magnet with arch-shaped cross-section, and disposed to orient a convex face thereof toward the center of the rotor core.

4. The permanent magnet rotor type electric motor according to claim 1, wherein the first permanent magnet is made of a rare-earth magnet with rectangular cross-section, and wherein the second permanent magnet is made of a ferrite magnet with rectangular cross-section, and disposed along a direction perpendicular to a diametrical line of the rotor core.

5. The permanent magnet rotor type electric motor according to claim 1, wherein the first permanent magnet is made of a rare-earth magnet with rectangular cross-section, and wherein the second permanent magnet is made of a ferrite magnet with arch-shaped cross-section, and disposed to orient a convex face thereof toward the center of the rotor core.

6. The permanent magnet rotor type electric motor according to claim 1, wherein the first permanent magnet is made of a rare-earth magnet with rectangular cross-section, and wherein the second permanent magnet is made of a ferrite magnet with trapezoid cross-section, and disposed to orient a upside thereof toward the center of the rotor core.

* * * * *